(12) United States Patent
Rucker et al.

(10) Patent No.: US 10,081,524 B2
(45) Date of Patent: Sep. 25, 2018

(54) MONITORING SYSTEM FOR TWO-POST LIFT

(71) Applicant: Gray Manufacturing Company, Inc., St. Joseph, MO (US)

(72) Inventors: Stephen J. Rucker, Savannah, MO (US); Ryan Herzog, St. Joseph, MO (US); Larry M. Jaipaul, Clarence, NY (US); Raymond W. Karleskint, Clarksdale, MO (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 0 days.

(21) Appl. No.: 15/699,593

(22) Filed: Sep. 8, 2017

(65) Prior Publication Data

US 2018/0072543 A1 Mar. 15, 2018

Related U.S. Application Data

(60) Provisional application No. 62/395,026, filed on Sep. 15, 2016.

(51) Int. Cl.
*B66F 3/46* (2006.01)
*B66F 7/24* (2006.01)
(Continued)

(52) U.S. Cl.
CPC ............ *B66F 7/24* (2013.01); *B66F 3/00* (2013.01); *B66F 7/28* (2013.01); *B66F 17/00* (2013.01);
(Continued)

(58) Field of Classification Search
CPC ...... B66F 1/00; B66F 3/00; B66F 3/46; B66F 7/00; B66F 7/20; B66F 5/00; B66F 5/04
See application file for complete search history.

(56) References Cited

U.S. PATENT DOCUMENTS 6,186,280 B1   2/2001   Healy
6,634,461 B1 * 10/2003   Baker ............... B66F 3/46
                                                  187/210

(Continued)

FOREIGN PATENT DOCUMENTS

DE   102005000883 B4   2/2008
EP       0631976 A1   1/1995

OTHER PUBLICATIONS

International Search Report and Written Opinion for related PCT Patent Application No. PCT/US201/051155, dated Nov. 22, 2017, 11 pages.

*Primary Examiner* — Lee D Wilson
(74) *Attorney, Agent, or Firm* — Hovey Williams LLP (57) ABSTRACT

A vehicle lift comprising a vertically-orientated column and a pair of swing arms vertically-shiftable with respect to the post. The swing arms are configured to rotate with respect to the column. The vehicle lift additionally includes a sensor associated with each swing arm. Each sensor is configured to obtain information related to its respective swing arm. Each sensor is also associated with a radio-frequency identification (RFID) tag, with the RFID tag being configured to provide power to its respective sensor. The vehicle lift further includes a system controller in communication with the sensors and configured to control the vehicle lift based on the information obtained by the sensors.

18 Claims, 8 Drawing Sheets

(51) Int. Cl.
*B66F 3/00* (2006.01)
*G01L 5/00* (2006.01)
*G06K 7/10* (2006.01)
*B66F 7/28* (2006.01)
*B66F 17/00* (2006.01)

(52) U.S. Cl.
CPC ........ *G01L 5/0061* (2013.01); *G06K 7/10009* (2013.01)

(56) References Cited

U.S. PATENT DOCUMENTS

| | | | |
|---|---|---|---|
| 9,254,990 B2* | 2/2016 | Matthews | B66F 7/08 |
| 2004/0200644 A1 | 10/2004 | Paine et al. | |
| 2007/0210923 A1* | 9/2007 | Butler | G06K 7/0008 |
| | | | 340/572.8 |
| 2008/0296071 A1 | 12/2008 | Herrmann | |
| 2009/0242333 A1* | 10/2009 | Finkbeiner | B66F 3/46 |
| | | | 187/209 |
| 2010/0066278 A1* | 3/2010 | De Jong | B66F 7/16 |
| | | | 318/376 |
| 2014/0161568 A1* | 6/2014 | De Jong | B66F 3/00 |
| | | | 414/21 |
| 2015/0232309 A1* | 8/2015 | Jaipaul | B66F 3/46 |
| | | | 414/800 |
| 2015/0246797 A1* | 9/2015 | Jaipaul | B66F 3/46 |
| | | | 700/225 |
| 2015/0307334 A1* | 10/2015 | Van Houten et al. | B66F 3/46 |
| | | | 700/213 |
| 2016/0152454 A1* | 6/2016 | Stapensea | B66F 3/46 |
| | | | 700/213 |

* cited by examiner

MONITORING SYSTEM FOR TWO-POST LIFT

CROSS-REFERENCE TO RELATED APPLICATION

This non-provisional patent application claims priority to U.S. Provisional Patent Application Ser. No. 62/395,026, entitled "MONITORING SYSTEM FOR TWO-POST LIFT," filed on Sep. 15, 2016. The entirety of the above-identified provisional patent application is hereby incorporated by reference into the present non-provisional patent application.

FIELD OF THE INVENTION

The present disclosure generally relates to systems and methods for monitoring lifts. More particularly, the present invention is directed to systems and methods for monitoring loads being supported by swing arms of two-post lifts.

BACKGROUND

The need to lift a vehicle from the ground for service work is well established. For instance, it is often necessary to lift a vehicle to access vehicle's undercarriage for tire rotation or replacement, steering alignment, oil changes, brake inspections, exhaust work, and other automotive maintenance. In the past, such lifting has often been accomplished through the use of "two-post" style lifts. These two-post lifts are generally used in systems of two or more lifting-posts configured either symmetrically or asymmetrically. Each lifting-post comprises a vertical column, with a carriage that actuates up and down the column. Attached to the carriage is a pair of outwardly-extending arms ("swing arms") configured to engage the undercarriage of the vehicle that is to be lifted.

It is generally necessary for the swing arms of two-post lifts to incorporate locking devices that secure the swing arms in place once the lifts begin to support a load (e.g., a vehicle). Such locking devices can prevent movement or shifting (e.g., rotation, retraction, or extension) of the swing arms once the vehicle begins to be lifted, so as to prevent the loss of the load. However, it is difficult to monitor and verify whether the swing arms on previously-used two-post lifts are properly locked in place. In addition, it is also difficult to monitor previously-used lifts to determine if the lifts' swing arms are overloaded or imbalanced.

BRIEF SUMMARY

Embodiments of the present invention may include a vehicle lift comprising a vertically-orientated column and a pair of swing arms vertically-shiftable with respect to the column. The swing arms are configured to rotate with respect to the column. The vehicle lift additionally includes a sensor associated with each swing arm, with each sensor being configured to obtain information related to its respective swing arm. Each sensor is also associated with a radio-frequency identification (RFID) tag, with the RFID tag being configured to provide power to its respective sensor. The vehicle lift further includes a system controller in communication with the sensors and configured to control the lift based on the information obtained by the sensors.

Embodiments of the present invention may additionally include a method for operating a vehicle lift, with the vehicle lift including a vertically-orientated column and a pair of vertically-shiftable swing arms, and with the swing arms being configured to rotate with respect to the column. The method may comprise the step of engaging the swing arms into contact with lifting-points of a vehicle. An additional step may include raising the vehicle. During such raising step, the method may include emitting an interrogation signal to radio-frequency identification (RFID) tags in communication with sensors associated with the swing arms. An additional step may include obtaining, via the sensors, information related to the swing arms. An additional step may include analyzing the information obtained from the sensors to determine if a problem condition exists. A further step may include, upon determining a problem condition exists, halting operation of the vehicle lift.

Embodiments of the present invention may additionally include a vehicle lift system comprising at least two lifting-posts. Each lifting-post comprises a vertically-orientated column and a pair of swing arms vertically-shiftable with respect to the column. The swing arms are configured to rotate with respect to the column about a generally horizontal plane. The lifting-posts may additionally include a sensor positioned on each of the swing arms, with each sensor being configured to measure a load that is supported by its respective swing arm. The lifting-posts may additionally include an RFID tag associated with each sensor, with the RFID tags being configured to provide power to the sensors and to transmit measurement data indicative of the loads measured by the sensors. The vehicle lift system may further comprise a system controller configured to receive the measurement data transmitted by the RFID tags and to control the lifting-posts based on the measurement data.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of embodiments of the present invention. Wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
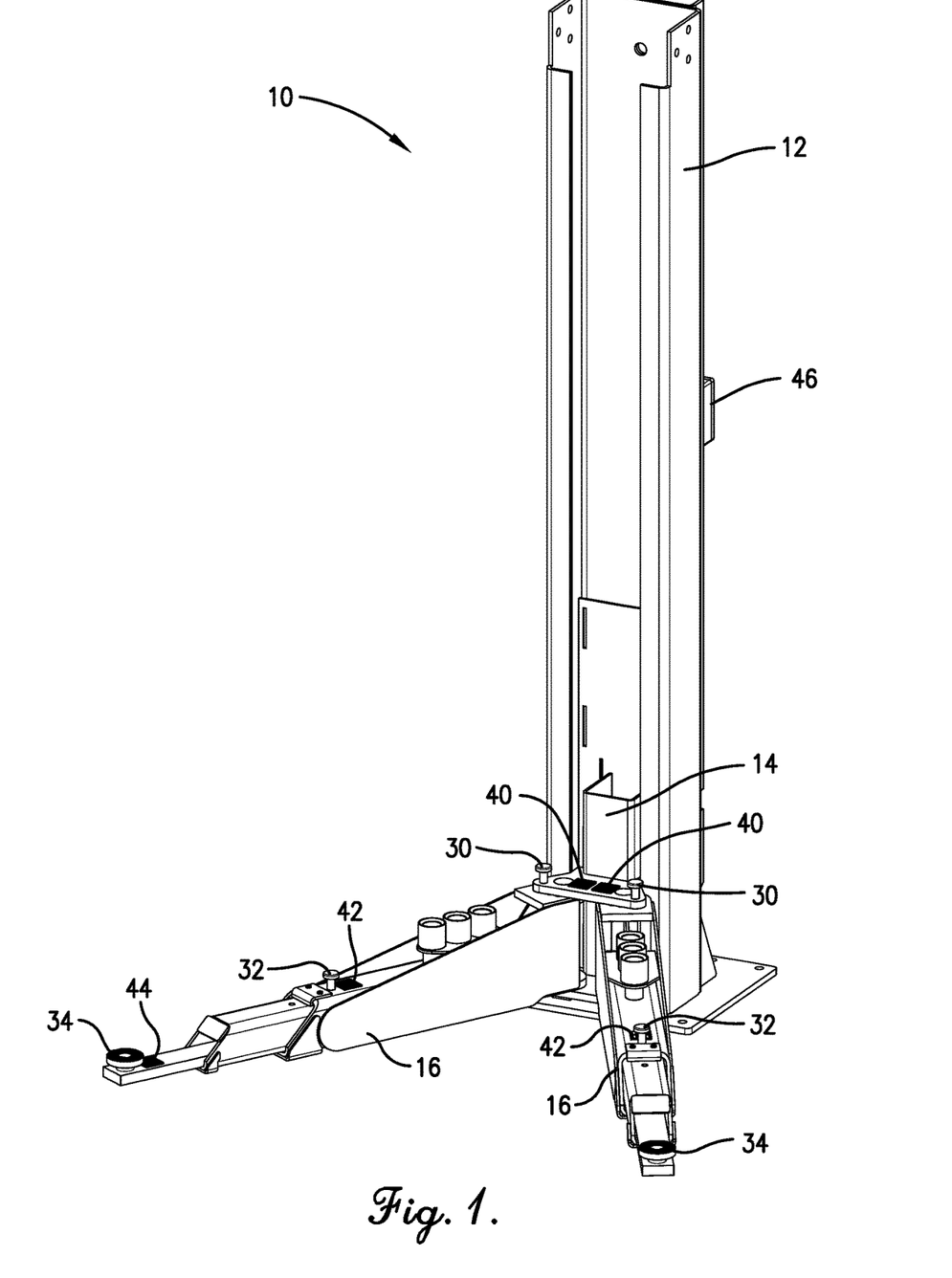
FIG. 1 is a front perspective view of a vehicle lifting-post according to embodiments of the present invention, with swing arms of the lifting-post being positioned in a particular rotational position and in a particular extension level.
Figure 2:
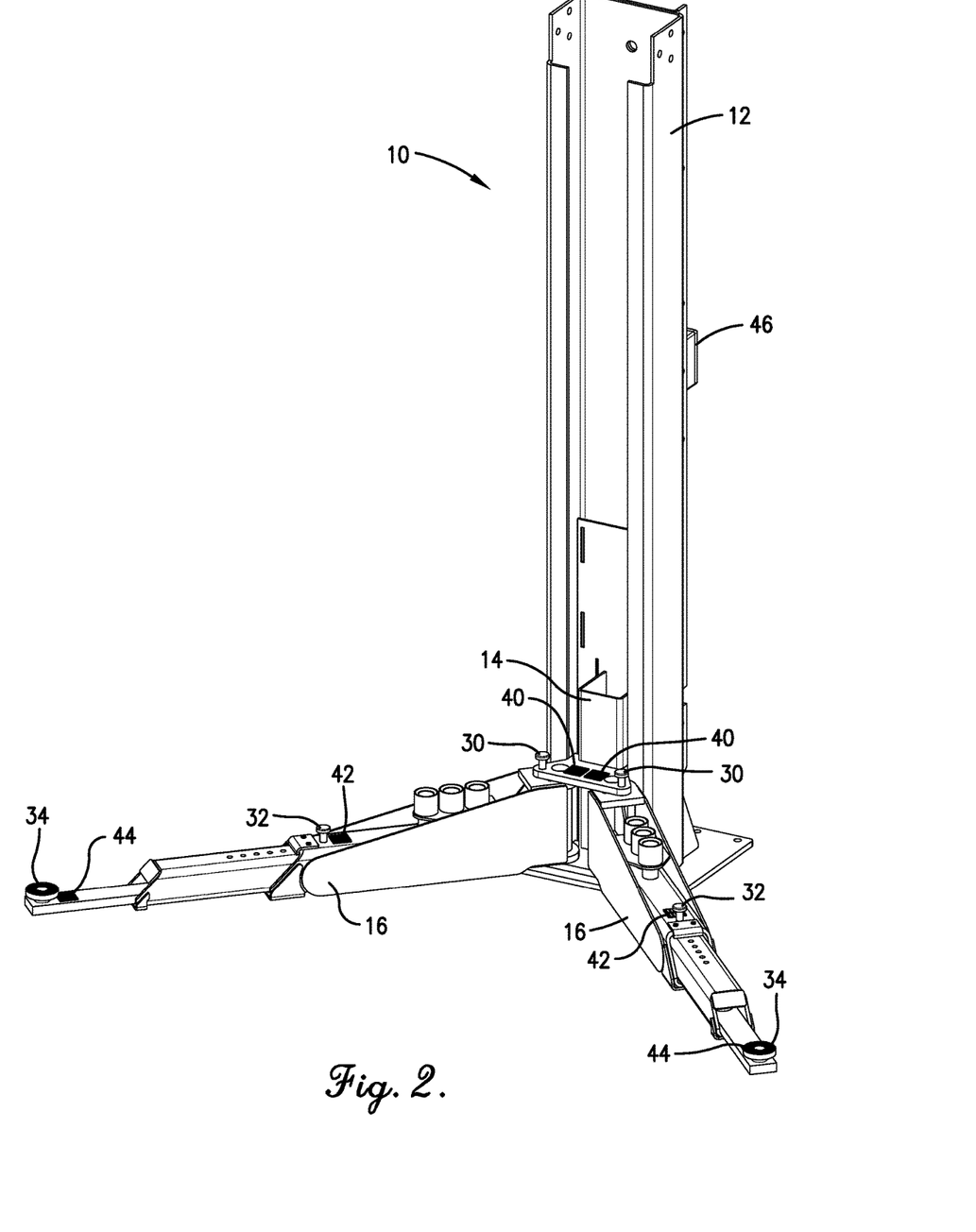
FIG. 2 is another front perspective view of the lifting-post from FIG. 1, illustrating the swing arms of the lifting-post being rotated to a different rotational position and being extended to a different extension level.
Figure 3:
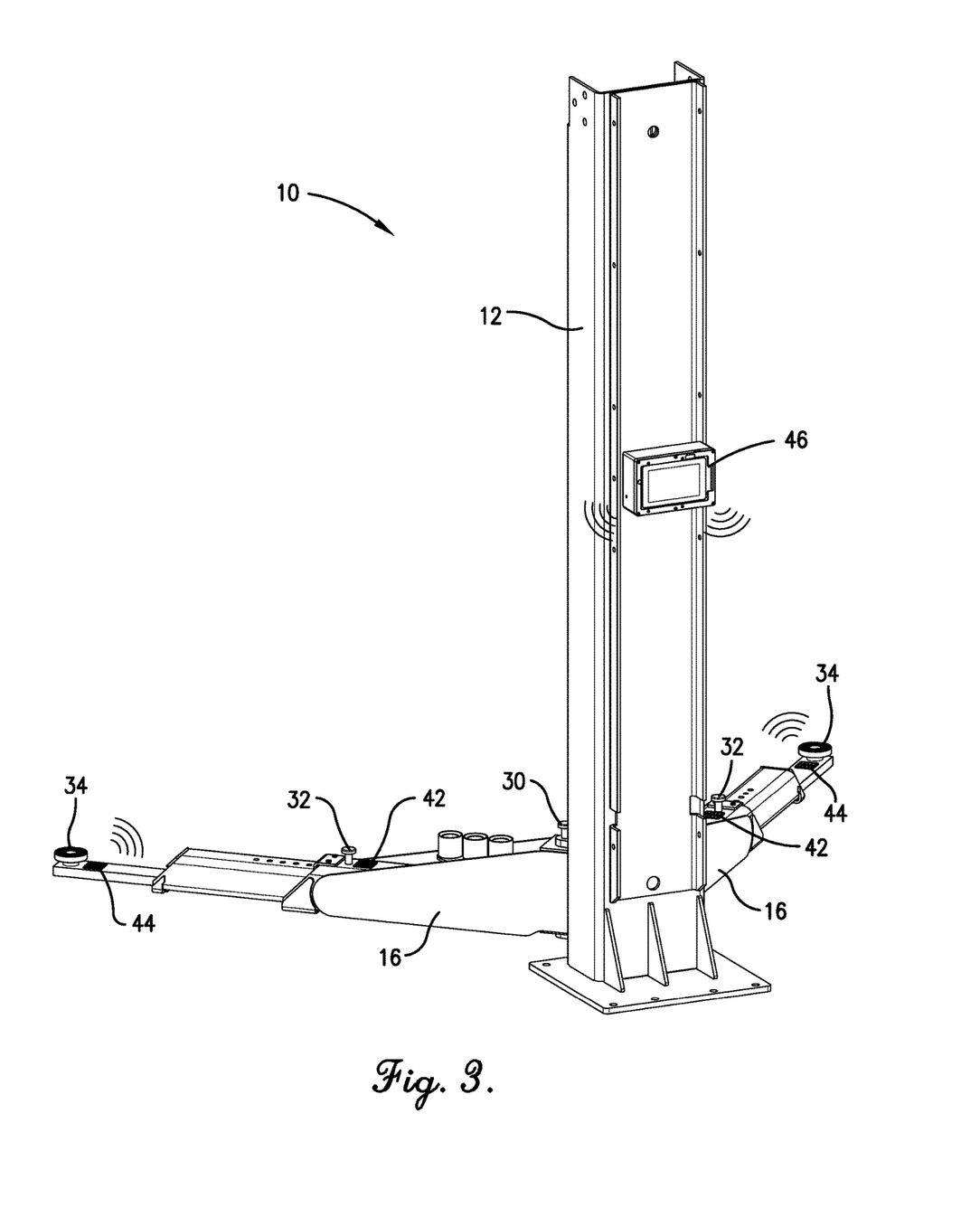
FIG. 3 is a rear perspective view of the lifting-post from FIG. 2.
Figure 4:
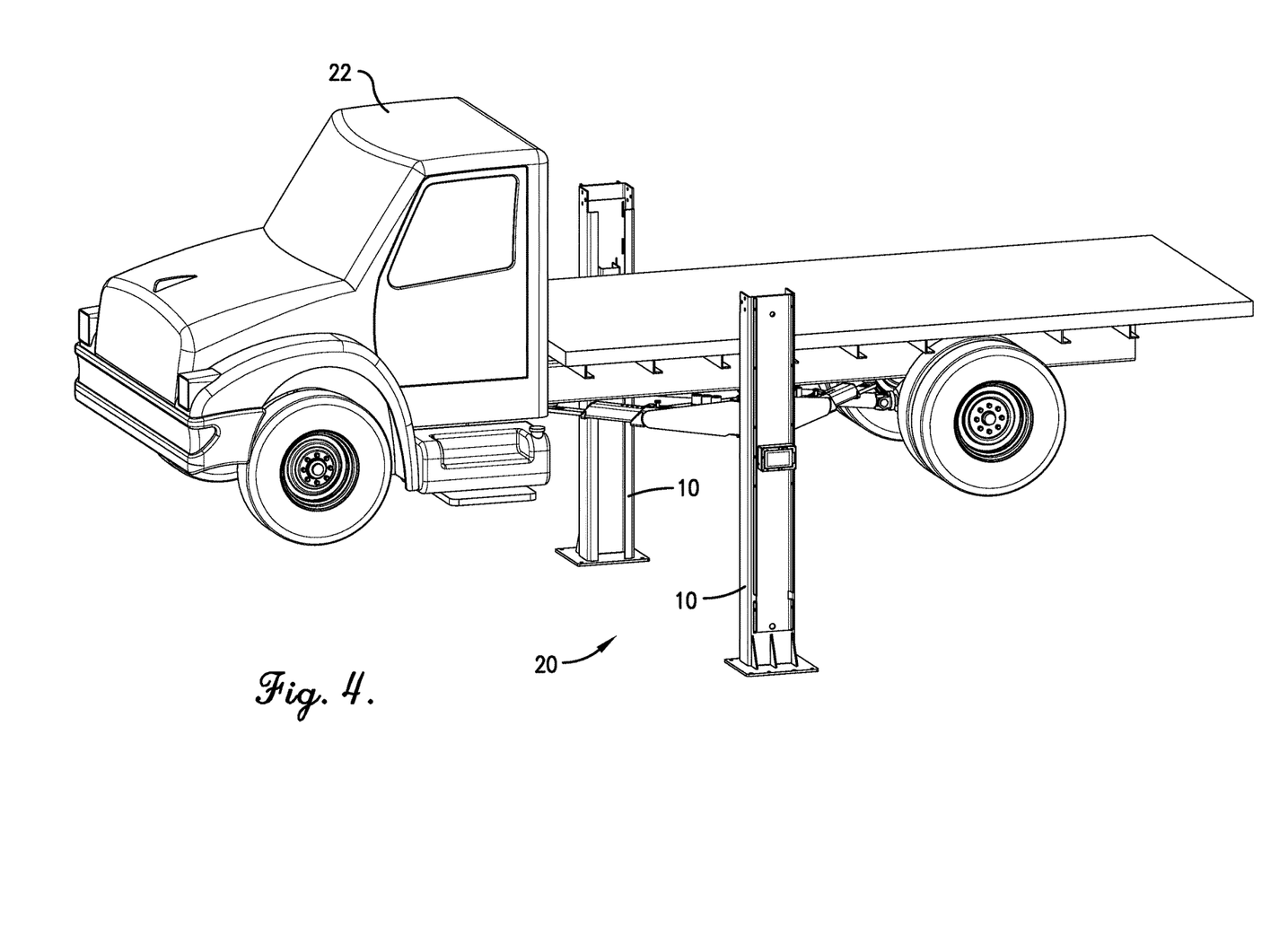
FIG. 4 is a perspective view of a two-post lift system that includes a pair of lifting-posts lifting a vehicle.

The present embodiments may relate to, inter alia, systems and methods for monitoring two-post lift systems. Referring to the drawings, an individual lifting-post 10 of a vehicle lift in the form of a two-post lift system according to embodiments of the present invention is shown in FIGS. 1-3. Broadly, the lifting-post 10 may comprise a vertically-extending column 12, a carriage 14 configured to be vertically shifted with respect to the column 12, and two telescoping swing arms 16 extending from the carriage 14 such that the swing arms 16 are configured to vertically shift along with the carriage 14. As shown in FIG. 4, a lift system 20 may, in some embodiments, comprise two or more lifting-posts 10 used in cooperation to lift a vehicle 22. However, in other embodiments, a lifting system may be in the form of a vehicle lift that includes only a single lifting-post 10.

In more detail, and with reference to FIGS. 1-2, the column 12 of each lifting-post 10 may comprise a generally hollow frame of high-strength material, such as steel, within which the carriage 14 can be vertically shifted. In some embodiments, the lift system 20 will include an actuator (not shown), which is configured to vertically shift the carriage 14 upward and downward within the column 12. In embodiments in which the lift system 20 includes a pair of lifting-posts 10, the actuator may be configured to simultaneously shift each carriage 14 within its respective column. 12 In some embodiments, the lift system 20 may be powered hydraulically, pneumatically, mechanically, or the like. In other embodiments, the lift system 20 may be powered hydraulically or mechanically by a system of cables and pulleys. Each of the swing arms 16 associated with each lifting-post 10 may be rotatably connected to the carriage 14 via a vertically-extending rotational axis. As such, each of the swing arms 16 are capable of rotating with respect to the column 12 and/or the carriage 14 about a generally horizontal plane. FIG. 1 illustrates the swing arms 16 rotated to a rotational position in which the swings arms 16 are positioned generally close together, while FIG. 2 illustrates the swing arms 16 rotated to a rotational position in which the swings arms 16 are positioned further apart. In some embodiments, each of the swing arms 16 may include a rotational locking element 30 that is capable of locking its associated swing arm 16 at a particular rotational position.

In addition, each of the swing arms 16 may comprise one or more telescopically-extending components, which provide for a distal end of each swing arm to be selectively extended and retracted with respect to the column 12 and/or the carriage 14. FIG. 1 illustrates the swing arms 16 retracted with the distal ends positioned generally close to the column 12, while FIG. 2 illustrates the distal ends of the swing arms 16 extending out further from the column 12. Each swing arm 16 may include an extension locking element 32 configured to lock the swing arm 16 at a particular extension level.

To lift a vehicle 22 (as is illustrated in FIG. 4), a lifting-post 10 can be positioned on either lateral side of the vehicle 22 that is to be lifted. In some embodiments, the lifting-posts 10 will be securely fastened to the ground, such as via one or more bolts extending through the columns 12 and into the ground. In such embodiments, the vehicle 22 will be maneuvered between the lifting-posts 10. Regardless, with the vehicle 22 positioned between the lifting-posts 10, the lift system 20 can raise the vehicle from the ground so as to permit inspection and/or maintenance of the undercarriage of the vehicle 22. In more detail, each of the lifting-posts 10 will initially be positioned in the lowered position, with each lifting-post's 10 carriage 14 and swing arms 16 situated below the undercarriage of the vehicle 22. The swing arms 16 of each of the lifting-posts 10 can be rotated (i.e., swung into place) and telescopically-extended to an appropriate position under a load-bearing, lifting-point of the vehicle 22. When in such a position, the rotational locking element 30 and the extension locking element 32 can be engaged in a locked position so as to secure each swing arm 16 at the appropriate rotational position and extension level.

In such a position, the lift system 20 can be used to raise and lower the vehicle 22. Specifically, with the lifting-posts 10 in the lowered position, the actuator of the lift system 20 can be used to raise the carriages 14 and, thus, the swing arms 16 of each of the lifting-posts 10 until the distal ends of the swing arms 16 engage with the load-bearing, lifting-points of the vehicle 22. In some embodiments, the distal end of each swing arm 16 may have a height-adjusting lift saddle 34 (See FIGS. 1-3), which can be actuated so as to make any minor height adjustments necessary for the swing arms 16 to make a level engagement with the load-bearing, lifting-points of the vehicle 22. With each of the swing arms 16 engaged appropriately with the undercarriage of the vehicle 22, the actuator of the lifting-posts 10 can continue to raise the carriages 14 and their associated swing arms 16 so as to raise the vehicle 22 above the ground. With the vehicle 22 raised to an appropriate height (i.e., a raised position), the vehicle can be inspected and/or repaired. Thereafter, the actuator of the lift system 20 can be used to lower the carriages 14 and their associated swing arms 16 until the vehicle 22 is again positioned on the ground. At such time, the rotational locking elements 30 and the extension locking elements 32 can be released to an unlocked position, such that the swing arms 16 can be retracted and swung out from underneath the vehicle 22 so that the vehicle 22 can be maneuvered away from between the lifting-posts 10.

As noted above, the vehicle 22 can pose a danger to user of the lift system 20 and/or to the lift system 20 itself, should the vehicle 22 become unbalanced or otherwise overload the lifting-posts 10 of the lift system 20. To address such concerns, embodiments of the present invention additionally include a monitoring system configured to monitor each swing arm 16 of the lifting-posts 10 during raising and lowering operations. The monitoring system of embodiments of the present invention may be configured to monitor, inter alia, (a) whether each swing arm 16 is properly secured in a locked position (e.g., via the rotation locking elements 30 and/or the extension locking elements 32), and/or (2) the real-time loads (i.e., weights) being supported by each swing arm 16. With reference to FIGS. 1-3, the monitoring system may broadly comprise, for each swing arm 16, a first lock sensor 40 associated with the rotational locking element 30 of the swing arm 16, a second lock sensor 42 associated with the extension locking element 32 of the swing arm, and a load sensor 44 associated with and positioned adjacent to a distal end of the swing arm 16, and a system controller 46 configured to communicate with and/or control the lock sensors 40, 42 and the load sensors 44.

Embodiments may provide for the lock sensors 40, 42 to comprise various types of sensing elements capable of sensing whether the rotational and extension locking elements 30, 32 are, respectively, in a locked position or an unlocked position. For example, the lock sensors 40, 42 may comprise sensing elements in the form of magnetic sensors, Hall Effect sensors, laser sensors, rotary encoders, string potentiometers, or the like. As will be described in more detail below, the lock sensors 40, 42 may be configured to be in communication with the system controller 46 (wired or wirelessly), such that the lock sensors 40, 42 for each swing arms 16 of the lifting-posts 10 of the lift system 20 can obtain and provide to the system controller 46 information indicative of whether the locking elements 30, 32 of the lifting-posts 10 are in locked positions or unlocked positions.

Turning to the load sensors 44, the load sensors 44 may comprise various types of sensing elements capable of measuring the loads being supported by the swing arms 16. For instance, in some embodiments, the load sensors 44 may comprise sensing elements in the form of load cells such as strain gauges configured to measure the deflection of the swing arms 16 resulting from applied loads, piezoelectric load cells configured to measure the deflection of the swing arms 16 resulting from applied loads, pneumatic load cells configured to measure pneumatic pressures resulting from loads applied to the swing arms 16, hydraulic load cells configured to measure hydraulic pressures resulting from loads applied to the swing arms 16, or the like. For example, in some specific embodiments, the load sensors 44 may comprise one or more strain gauges in the form of metallic foil patterns. The electrical resistance of such metallic foil patterns may be configured to change based on the deformation of the patterns. Thus, when the strain gauges are positioned on the swing arms 16, the strain gauges can measure a deflection of the swings arms 16 by measuring a change in electrical resistance due to the deformation of the foil patterns. In some embodiments, the strain gauges may be associated with an amplifier for amplifying the output signal of the strain gauges. In even further embodiments, the strain gauges may be arranged in a Wheatstone bridge arrangement, which includes four, electrically-connected strain gauges. Such a Wheatstone bridge arrangement may be used to increase the sensitivity of the load sensors' 44 measurements.

Figure 5:
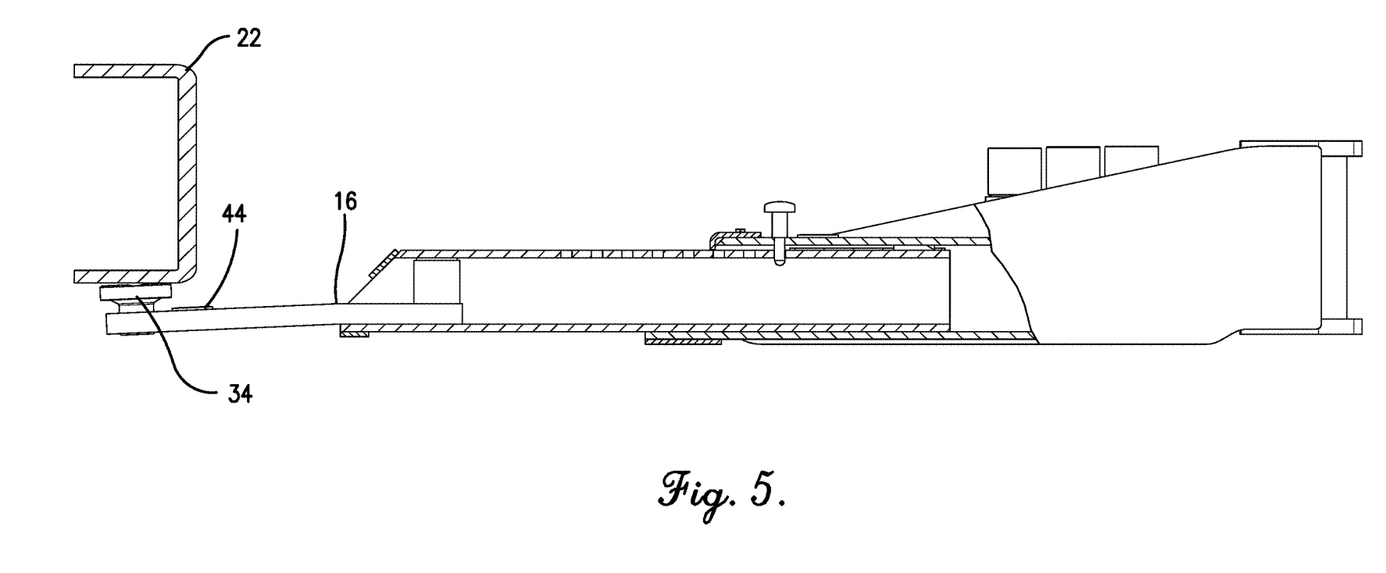
FIG. 5 is a cross-section view of a swing arm from one of the lifting-posts from FIG. 4, with a distal end of the swing arm shown deflecting downward under weight of the vehicle being lifted.

In some embodiments, each load sensor 44 may be positioned near a distal end of its respective swing arm 16 so as to measure a significant portion of any deflection being experienced by the swing arm 16. For example, FIG. 5 illustrates an exemplary load sensor 44, such as a strain gauge or piezoelectric load cell, which is positioned near the distal end of the swing arm 16. The load sensor 44 shown in FIG. 5 is configured to measure the downward deflection of the swing arm due to the weight of the vehicle 22 being supported by the swing arm 16. As will be described in more detail below, the load sensors 44 may be in communication with the system controller 46 (wired or wirelessly), such that the load sensors 44 can obtain and provide to the system controller 46 an indication of the real-time loads being supported by each of the swing arms 16.

In some embodiments, the lift system 20 may include only a single system controller 46. However, in other embodiment, each lifting-post 10 within a lift system 20 may include its own system controller 46. As perhaps best shown in FIG. 3, certain embodiments may provide for the system controller 46 to be positioned on a rear side of the column 12 of the lifting-post 10, at a height that corresponds with an eye level of a user of the lift system 20. Broadly, the system controller 46 may comprise a computing device for receiving information from the sensors (i.e., the lock sensors 40, 42 and the load sensors 44) and for providing instructions to the lifting-post 10 and/or the lift system 20 based on such received information. In some additional embodiments, the system controller 46 may be configured to communicate with and/or provide power to the sensors. In more detail, the system controller 46 may be configured to processes lift instructions associated with the lifting-posts 10 of the lift system 20, so as to control operation (e.g., raising, lowering, stopping, parking, etc.) of the lifting-posts 10 based, at least in part, on the information provided by the lock sensors 40, 42 and/or the load sensors 44.

Figure 6:
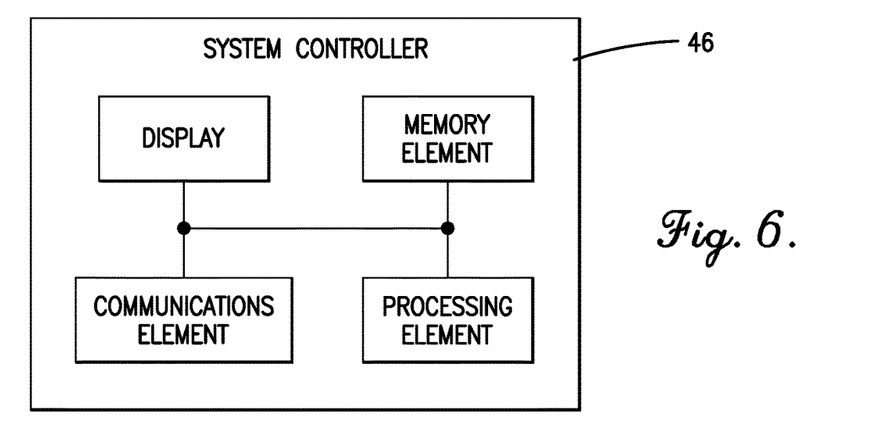
FIG. 6 is a schematic view of a system controller of the lifting-post from FIGS. 1-3.

As illustrated in FIG. 6, the system controller 46 may comprise one or more processing elements and memory elements. The processing elements may comprise microprocessors, microcontrollers, field programmable gate arrays, and the like, or combinations thereof. In some embodiments, the processors may comprise one or more single-core, dual-core, or quad-core processors configured for simultaneously processing various types of information and/or for executing a plurality of different computer programs or software applications. As such, the processors of the system controller 46 may be operable to implement operating systems, and may generally be capable of executing computer programs, which are also commonly known as instructions, commands, software code, executables, applications, apps, and the like, which may all be stored on the memory elements of the system controller. The memory elements may be capable of storing or retaining computer programs, and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, memory cards, optical storage media such as compact discs (CDs or CDROMs), digital video disc (DVD), Blu-ray™, and the like, or combinations thereof.

In some embodiments, the system controller 46 may include an electronic display, such as: a plasma display, a light-emitting diode (LED) display, an organic LED (OLED) display, a Light Emitting Polymer (LEP) or Polymer LED (PLED) display, liquid crystal display (LCD) display, a thin film transistor (TFT) LCD display, a LED side-lit or back-lit LCD display, heads-up displays (HUDs), or the like, or combinations thereof. The display may include a screen on which the information is presented. In various embodiments, the display may also include a touch screen occupying the entire screen or a portion thereof so that the display functions as, or as part of, as user interface for the system controller 46. The touch screen may allow the user to interact with the system controller 46 by physically touching, swiping, or gesturing on areas of the screen.

The system controller 46 may also include a communications element configured as one or more wired or wireless transceivers that communicate with other devices, systems or network. The communication element may include signal or data transmitting and receiving circuits, such as antennas, transceivers, amplifiers, filters, mixers, oscillators, digital signal processors (DSPs), and the like. The communication element may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables.

As noted above, the sensors of the lifting-posts 10 may be linked with the system controller 46 via wired or wireless connection. Such wired or wireless connections may be used to transfer data and/or to power the sensors, as well as to transfer data to the system controller 46. Embodiments of the present invention may include various means by which the sensors of the lifting-posts 10 can be powered and can communicate with the system controller 46. For example, in some embodiments, each of the sensors of a lifting-post 10 may be hard-wired, such as via a power and communications cable (e.g., a USB cable), to the system controller 46 associated with the lifting-post 10. In certain embodiments, the power and communications cables may be retractable, such that the power and communications cables can maintain the link between the sensors and the system controller 46 as the swing arms 16 are rotated and extended and the carriage 14 travels up and down. Such retractable power and communications cables may be configured to provide a power connection between the system controller 46 and the sensors, such that the system controller 46 can be configured to provide electrical power to the sensors so that the sensors can function to determine states of the locking elements 30, 32 and/or the loads being supported by the swing arms 16. The system controller 46 itself may be powered by a power source associated with the lifting-post 10 (e.g., a battery) or from AC mains. In addition to providing electrical power, the retractable power and communications cable may also be configured to facilitate wired communication between the sensors and the system controller 46, such that the sensors can provide information to the system controller 46 regarding the state of the locking elements 30, 32 and/or the loads being supported by the swing arms 16.

Figure 7A:
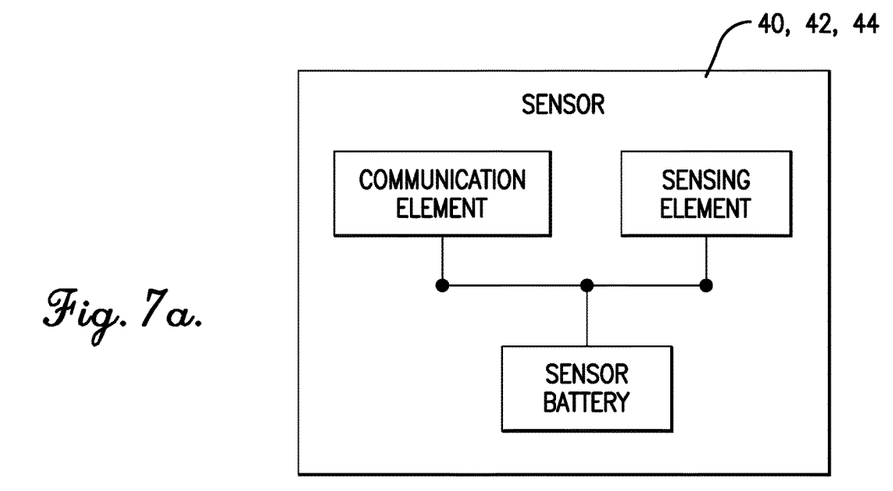
FIG. 7a is a schematic view of a sensor for obtaining information related to the swing arms of the lifting-post from FIGS. 1-3, with the sensor including an integral sensor battery.

In additional embodiment of the present invention, the sensors of the lift system 20 may each be associated with a dedicated power source configured to provide electrical power to the sensors. For example, each of the lifting-posts 10 may include a sensor battery positioned on the lifting-post 10 and connected to the sensors, such that the sensor battery can provide electrical power to each of the sensors on the lifting-post 10. In some embodiments, the sensors may be hard-wired to the sensor battery so as to receive the electrical power necessary to operate the sensors. In additional embodiments, each sensor may be associated with its own sensor battery. For example, each of the load sensors 44 may be associated with an individual sensor battery positioned on the swing arm 16 adjacent to the sensor. In some further embodiments, the sensors may each be configured to have an integral sensor battery. For example, as illustrated in FIG. 7a, each sensor (i.e., lock sensors 40, 42 and/or load sensor 44) may include, in addition to the sensing element, a sensor battery configured to provide electrical power to the sensing element so that the sensing element can collect applicable measurement data from its respective swing arm 16. In some embodiments, the sensor battery(ies) may be rechargeable. In such embodiments, if the sensor battery(ies) has a low charge, the sensor or the sensor battery(ies) may be configured to send a signal (wired or wirelessly) to the system controller 46 to halt operation of the lifting-post 10 until the sensor battery(ies) has been sufficiently charged or replaced.

In some embodiments, each of the sensors may additionally comprise a communications element configured as one or more wired or wireless transmitter or transceivers that can communicate with the system controller 46. The communication element may include signal or data transmitting and receiving circuits, such as antennas, transceivers, amplifiers, filters, mixers, oscillators, digital signal processors (DSPs), and the like. The communication element may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables. In embodiments in which the communications element is a wireless transmitter or transceiver, the sensor battery of the sensor may provide the necessary power to the communications element. In some such embodiments, the communications element of one or more of the sensors may be in the form of an active radio frequency identification radio-frequency identification (RFID) tag. Such active RFID tags may include their own electrical power sources, such as the sensor batteries discussed above. Although the above description provides for the communications elements as being part of the sensors, in some embodiments, the communications elements may be separate from and operate independently of the sensors.

Figure 7B:
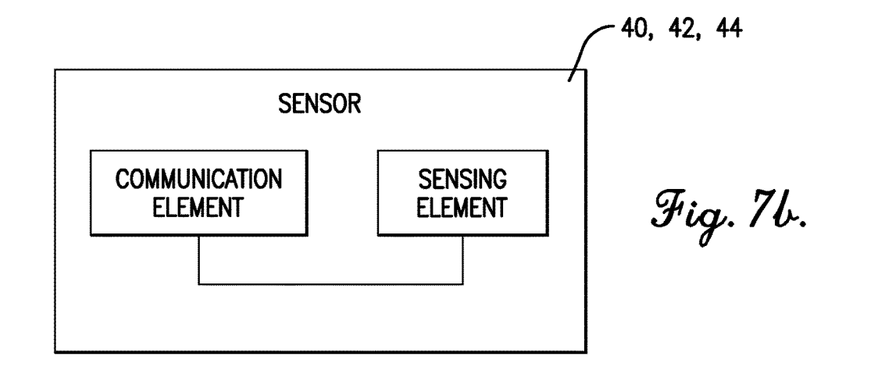
FIG. 7b is a schematic view of another sensor for obtaining information related to the swing arms of the lifting-post from FIGS. 1-3, with the sensor not including an integral sensor battery.

In further embodiments of the present invention, the sensors included in the lifting-posts 10 of the lift system 20 may be associated with a communications element in the form of a passive RFID tag. As shown in FIG. 7b, embodiments may provide for the communication element (e.g., the RFID tag) to be integrated with the sensors, such that standard wires/cables may not be required to connect the sensing elements and the communications elements. However, in other embodiments, the RFID tag-type communications element may be separated from the sensors. In such embodiments, the RFID tags may be connected to the sensors via hard-wire connection. Regardless, such passive RFID tags may not require their own dedicated power source, such that the sensors may not require sensor batteries. Instead, the passive RFID tags may comprise RF antennas configured to receive power wirelessly via radio frequency (RF) waves/signals. For example, as illustrated in FIG. 3, the system controller 46 may be configured to function as an RFID reader, which receives power from its own battery or from AC mains. When the system controller 46 requires information from the sensors, the system controller 46 may interrogate the sensors by emitting a wireless RF signal (i.e., an interrogation signal), which can be received by the passive RFID tags of the sensors. Each of the RFID tags may be configured to convert the interrogation signal into an electrical potential, which can be used to power the sensing elements of the sensors.

The electrical potential generated by the RFID tags may be applied to the sensing elements, such that the sensors can perform their intended function to obtain measurement data from the swing arms 16. For example, for the load sensors 44, each of the load sensors 44 can perform a load measurement to determine the load currently being supported by its respective swing arm 16. For the lock sensors 40, 42, each of the lock sensor 40, 42 can perform a measurement to determine whether its locking element (e.g., rotational locking element 30 or extension locking element 32) is in either a locked position or an unlocked position. Upon obtaining measurement data, the sensors can provide such measurement data back to the RFID tag, and the RFID tag can wirelessly transmit, via its RF antenna, such measurement data to the system controller 46 for further analysis. Such transmission may be powered by the electric potential previously generated by the RFID tag from the interrogation signal. It should be understood that the term "transmit" or "transmitting" used herein with respect to the RFID tags (and particularly with respect to passive RFID tags) may include backscattering, which may include the attenuated and/or otherwise altered reflection of the interrogation signal. In some embodiments, the system controller 46 may be configured to interrogate the sensors on a periodic basis, such that the system controller 46 can, correspondingly, receive the measurement data from the sensors on such a periodic basis. For example, such periodic basis may be every 5 seconds, every 1 second, every 0.5 second, every 0.1 second, every 0.01 second, or less. It may, in some embodiments, be preferable for the system controller 46 to interrogate the sensors on a periodic basis that is as short as possible, such that the system controller 46 can obtain measurement data in essentially real time.

In an even further embodiment of the present invention, the sensors of the lift system 20 may be associated with a wireless power transfer system, such as in the form of an inductive coupling system or a capacitive coupling system. In such embodiments, one or more of the sensors of each lifting-post 10 may comprise (1) an inductive or capacitive coupling receiver (e.g., windings or capacitors) for receiving wireless power via RF radio signals, and (2) integral batteries or capacitors configured to store the electrical charge received by the inductive coupling receiver. The electrical charge can, thus, be used by the sensors for obtaining measurement data and/or for transmitting the measurement data to the system controller 46 via the communications elements of the sensors (e.g., RF transmitters).

The coupling receiver of the wireless power transfer system may be configured to receive electrical power from a coupling transmitter that is wirelessly connected with the coupling receiver via inductive or capacitive coupling. In some embodiments, the coupling transmitter may be associated with the system controller 46. In other embodiments, the coupling transmitter may be located elsewhere, such as integrated in the facility in which the lift system 20 is being operated. The wireless power transfer system may be configured to transfer power from the coupling transmitter to the coupling receiver continuously or intermittently/periodically as needed. For example, in some embodiments, the coupling transmitter may transmit electrical power once per hour, such that the integral batteries and/or capacitors of the sensors can maintain a sufficient charge to power the sensors. In addition, embodiments of the present invention may provide for the sensors' communications elements to transmit measurement data to the system controller 46 only at specific times (e.g., on a periodic basis during raising and lowering operations of the lifting-posts 10) so as to reduce energy usage. To facilitate operation of the wireless power transfer system, such embodiments may require the use of a microcontroller (or other computing device) that facilitates communication between and operability of the components of the wireless power transfer system. For example, the microcontroller may activate the sensors and their communications elements only periodically (or only during raising and lowering operations of the lifting-posts 10), so as to conserve power usage and to maintain the charge of the batteries or capacitors of the sensors.

Operation of the lift system 20 will now be described in more detail. Once the swing arms 16 of the lifting-posts 10 are properly positioned and locked in place under a load-bearing, lifting-point of a vehicle 22, the lifting-posts 10 can be used to lift the vehicle from a lowered position to a raised position, or vice-a-versa, as is illustrated in FIG. 4. At all times during such raising and/or lower operations, each of the lock sensors 40, 42 and/or the load sensors 44 of the lifting-posts 10 are configured to continuously (or periodically) provide measurement data to the system controller 46, such that the system controller 46 can analyze the state of the lifting-post 10. For example, the lock sensors 40, 42 may continuously (or periodically) provide measurement data to the system controller 46 in the form of the status of the rotational and extension locking elements 30, 32 on each of the swing arms 16. If, during raising and/or lowering of the lifting-posts 10, the rotational and extension locking elements 30, 32 of each of the lifting-posts 10 are maintained in the locked position, the lifting-posts 10 are permitted to continue operating as normal. Contrastingly, if at any time during raising or lowering, any of the rotational or extension locking elements 30, 32 is sensed as being in the unlocked position, the lock sensor 40, 42 associated with such unlocked rotational or extension locking element 30, 32 will send an indication of such unlocked state to the system controller 46, such that the system controller 46 can send a signal to the actuator of the lifting-posts 10 to automatically stop the raising or lowering. The system controller 46 may maintain the lifting-posts 10 in an inoperable state until all of the rotational and extension locking elements 30, 32 are reset to the locked position. It should be understood that embodiments may provide for the system controller 46 to halt operation of each of the lifting-posts 10 in the lift system 20 regardless of whether only a single lifting-post's 10 rotational or extension locking element 30, 32 is found to be in an unlocked position. As such, each of the lifting-posts 10 in the lift system 20 can be caused to immediately halt raising and lowering operations until the rotational or extension locking element 30, 32 of the faulty lifting-post 10 is reset to the locked position.

In addition to the lock sensors 40, 42, the load sensors 44 of the swing arms 16 of each of the lifting-posts 10 can be configured to provide a continuous, real-time (or periodic) measurement data to the system controller 46 indicative of the loads being supported by each of the swing arms 16. Based on such measurement data, the system controller 46 may be configured to determine for each swing arm 16 of each lifting-post 10 in the lift system 20 (1) an initial load supported by the swing arm 16 at the start of a raising or lowering operation, and (2) a real-time load being supported by the swing arm 16 during the raising or lowering operation. In addition, the system controller 46 may be configured to determine (2) a real-time load supported by each lifting-post 10 in the lifts system 20 (i.e., a sum of the loads supported by each swing arm 16 of each lifting-post 10), and (2) a real-time load distribution of the load on the lifting-post 10 (i.e., a difference between the loads being supported by each swing arm 16 of a given lifting-post 10, as well as a difference between the loads being supported by each lifting-post 10 in the lifts system 20).

If the system controller 46 determines that any of the load sensors 44 indicate that a problem condition exists (i.e., the load supported by the lifting-posts 10 is being raised or lowered in an unsafe or destructive manner), then the system controller 46 may instruct the actuator(s) of the lifting-posts 10 and/or the lift system 20 to immediately halt operations until the problematic condition is rectified. For example, the following problem conditions (as determined by the system controller 46 based on the measurement data obtained and provided by the load sensors 44) may require operation of the lifting-posts 10 to be halted: (1) a significant load change experienced by any of the swing arms 16 during lifting or lowering operations, which may indicate (i) possible inadvertent movement of the vehicle 22, (ii) inadvertent movement of the swing arm 16, (iii) and/or failure of a locking element 30, 32 associated with the swing arm 16), (2) uneven load distribution between the swing arms 16 (may indicate possible imbalance of the vehicle on a lifting-post 10, such as the vehicle's center of gravity being improperly balanced between the swing arms 16), (3) uneven load distribution between the individual lifting-posts 10 of the lift system 20 (may indicate possible imbalance of the vehicle between the lifting-posts 10, such as the vehicle's center of gravity being improperly balanced between the lifting-posts 10), (4) the load on any individual swing arm 16 being higher than a rated capacity of the swing arm 16, and/or (5) the overall load supported by any one or all of the lifting-posts 10 of the lift system 20 being higher than a rated capacity for the lifting-posts 10 and/or the lift system 20. Should any of the above-stated problematic conditions be found to exist, the system controller 46 may automatically instruct the actuators of the lifting-post 10 and/or the lift system 20 to halt operations until such problematic condition is rectified.

Figure 8:
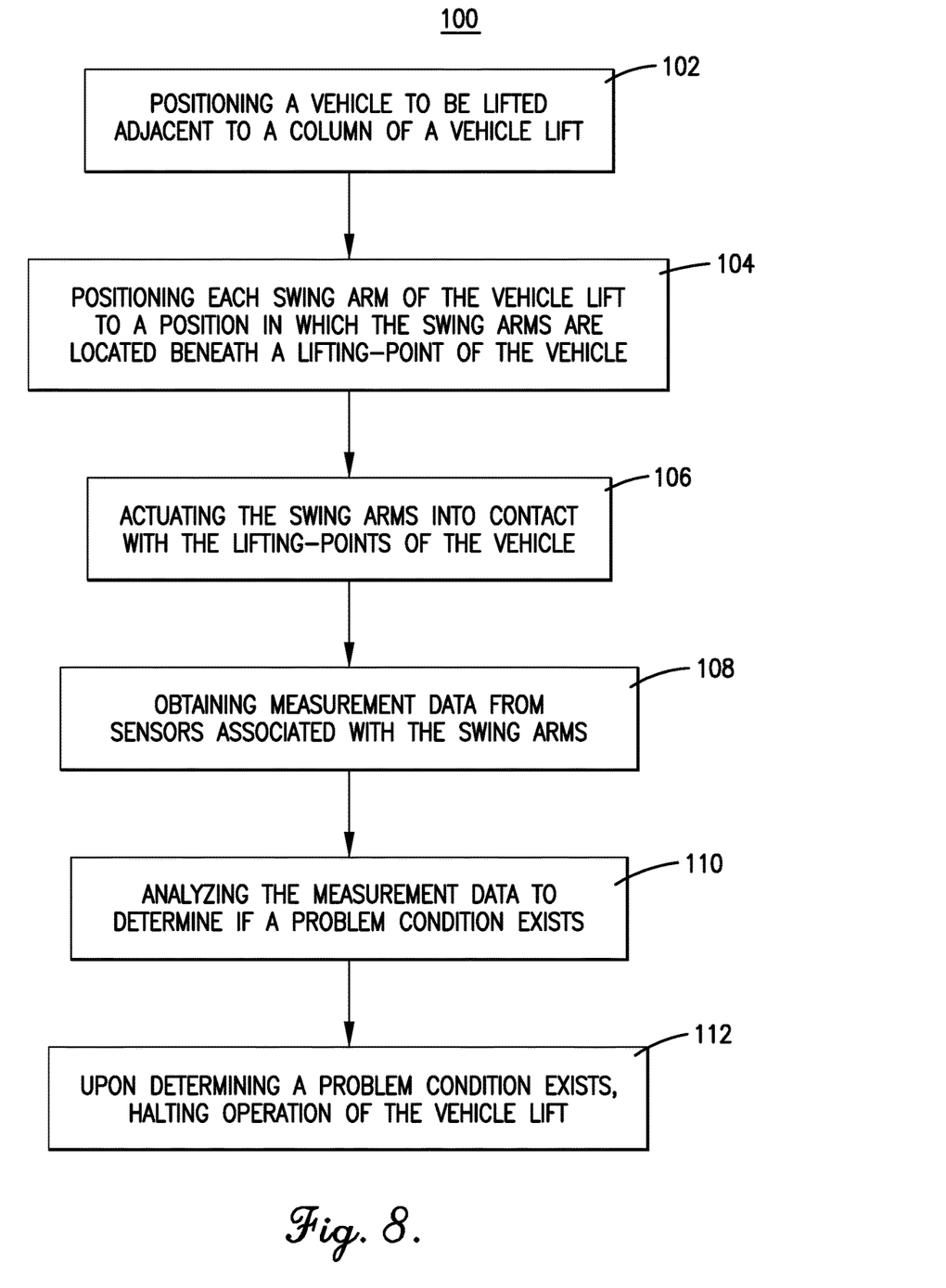
FIG. 8 is a flowchart of a method for operating a vehicle lift system according to embodiments of the present invention.

In view of the above, and as illustrated in FIG. 8, embodiments of the present invention include a method 100 for operating a lift system 20. The method 100 may include a Step 102 of positioning a vehicle 22 to be lifted adjacent to a column 12 of a vehicle lift (e.g., column 12 of a lifting-post 10). An additional Step 104 may include positioning each swing arm 16 of the vehicle lift to a position in which the swing arms 16 are located beneath a lifting-point of the vehicle 22. An additional Step 106 may include actuating the swing arms 16 into contact with the lifting-points of the vehicle 22. An additional Step 108 may include obtaining measurement data from sensors associated with the swing arms 16. Such measurement data may be obtained while the vehicle lift is raising or lowering the vehicle. Examples of sensors used to obtain the measurement data may include the lock sensors 40, 42 and/or the load sensors 44. Examples of such measurement data include data indicative of the loads being supported by each of the swing arms 16. Other examples include data indicative of whether the rotational and/or extension locking elements 30, 32 are in the locked or unlocked position. An additional Step 110 may include analyzing the measurement data to determine if a problem condition exists. An example of a problem condition may include a current load experienced by one or more of the swing arms 16 being significantly different (i.e., significantly higher or less than) an initial load experienced by one or more of the swings arms 16 at the beginning of the process of raising the vehicle 22. A further Step 112 includes, upon determining a problem condition exists, halting operation of the vehicle lift.

For example, the method 100 may, broadly, be used in the following manner. Once the swing arms 16 are positioned in place underneath the vehicle 22 and in contact with the lifting points of the vehicle 22, the lifting-post 10 can begin to raise the vehicle 22. At such time, an initial load of one or both of the swing arms 16 can be measured by the load sensors 44 of the swing arms 16. Thereafter, the load sensors 44 can continue to make measurements of the loads being experience by the swing arms 16 as the lifting-post 10 is raising the vehicle 22. If any subsequent load measurement of one or both of the swing arms 16 is found to deviate from the initial load measurement by more (or less) than a predefined amount, then embodiments may determine that a problem condition exists and operation of the lifting-post 10 will be halted. In some embodiments, such subsequent load measurements may be obtained either periodically or continually. In addition, a problem condition may exist if, at any time during the raising or lowering process, the load measurement obtained for any one of the swing arms 16 exceeds a maximum capacity for the swing arms 16. Similarly, a problem condition may exist if, at any time during the raising process, the total load measurement obtained for the lifting-post 10 (i.e., combined capacity for both swing arms 16) exceeds a maximum capacity for the lifting-post 10. Furthermore, if a pair of lifting-posts 10 is being used to lift the vehicle 22, a problem condition may exist of the total load being supported by both lifting-posts 10 exceeds a maximum capacity of the combined lifting-posts 10.

In addition to above, problem conditions may exist if the load being supported by the lifting-post 10 becomes unbalanced during raising or lowering. For example, with respect the method 100, if at any time while the vehicle 22 is being raised or lowered the difference between the loads measured by each of the swing arms 16 of the lifting-post 10 deviates by more than a predefined amount, then a problem condition may exist. Similarly, if a pair of lifting-posts 10 (e.g., a lift system 20) is being used to lift the vehicle 22, a problem condition may exist if the load being supported by one lifting-post 10 deviates more than a predefined amount from the load being supported by the other lifting-post 10. Either such instance of load imbalance may be considered a problem condition, such that the system controller 46 may halt operation of one or all of the lifting-post(s) 10 in the lift system 20.

Figure 9:
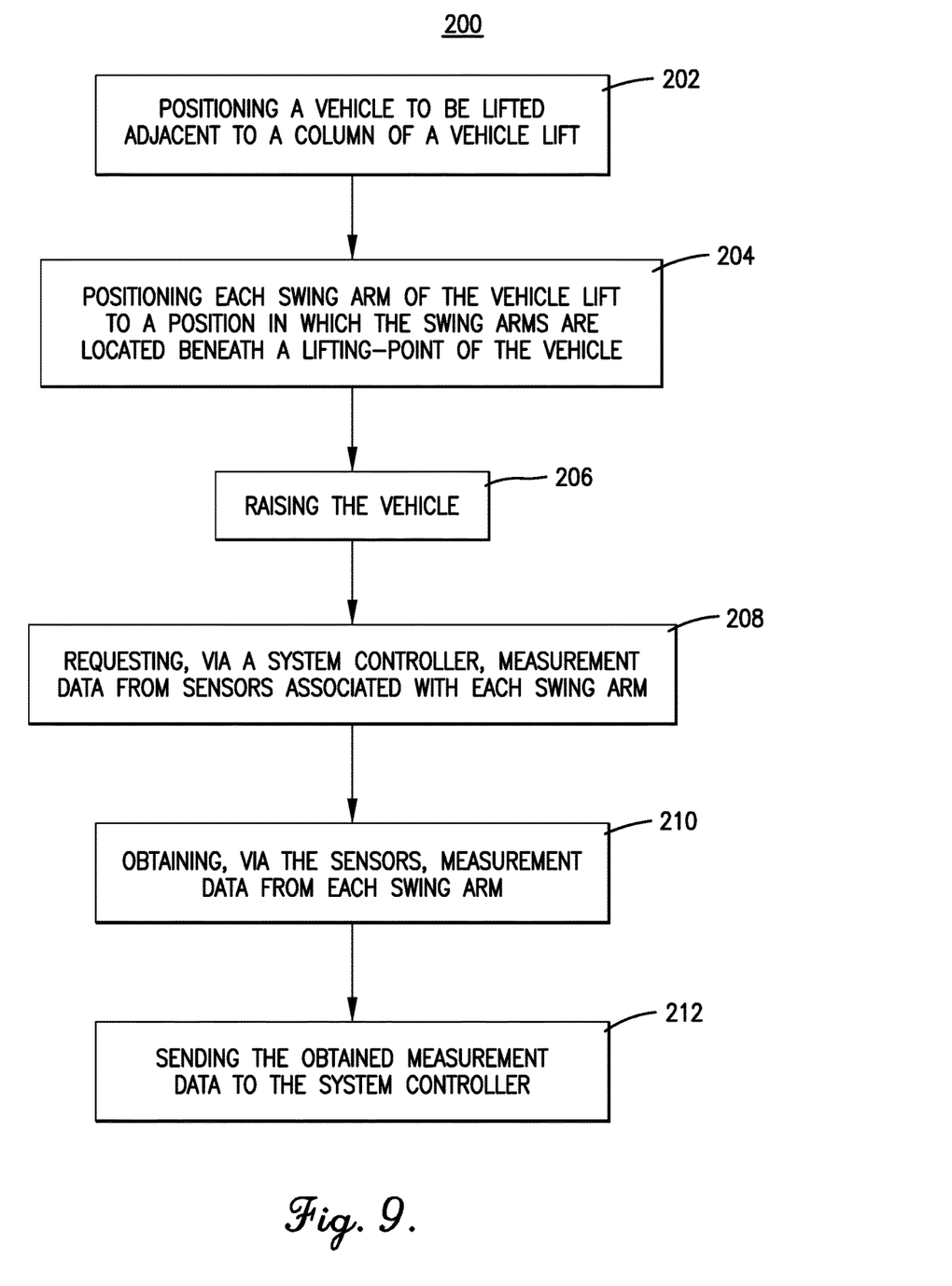
FIG. 9 is a flowchart of another method for operating a vehicle lift system according to embodiments of the present invention.

Embodiments of the present invention may additionally include a method 200, as illustrated in FIG. 9, for operating a vehicle lift system 20. The method 200 may include a Step 202 of positioning a vehicle 22 to be lifted adjacent to a column 12 of a vehicle lift (e.g., column 12 of lifting-post 10). An additional Step 204 may include positioning each of the swing arms 16 of the vehicle lift to a position in which the swing arms 16 are located beneath a lifting-point of the vehicle 22. An addition Step 206 may include raising the vehicle. An additional Step 208 may include requesting, via a system controller 46, measurement data from sensors associated with each swing arm 16. An additional Step 210 may include obtaining, via the sensors, measurement data from each swing arm. An additional Step 212 may include sending the obtained measurement data to the system controller 46. In some embodiments, the requesting of Step 208 may be in the form of the system controller emitting an interrogation signal, which is received by the sensors. In some embodiments, the sensors will include, or will otherwise be associated with, an RFID tag, with such RFID tags being configured to receive the interrogation signals and to convert the interrogation signals into electric potentials that can power the sensors. Furthermore, the sending of Step 212 may include the sensors transmitting the measurement data to the system controller 46 via the RFID tags. Based on an analysis of the measurement data, the system controller 46 may be configured to halt operation of the vehicle lift and/or the lift system 20, should a problem condition be detected.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems or one or more hardware modules of a computer system (e.g., a processor or a group of processors) may be configured by software (e.g., an application or application portion) as computer hardware that operates to perform certain operations as described herein.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:
1. A vehicle lift comprising:
a vertically-orientated column;
a pair of swing arms vertically-shiftable with respect to said column, wherein said swing arms are configured to rotate with respect to said column;
a sensor associated with each swing arm, wherein each sensor is configured to obtain information related to the swing arm with which the sensor is associated, wherein each sensor is associated with a radio-frequency identification (RFID) tag, with each RFID tag being configured to provide power to the sensor with which the RFID tag is associated,
wherein said sensors comprise load sensors configured to measure loads being supported by said swing arms, and wherein said load sensors comprise strain gauges configured to measure deflections experienced by said swing arms; and
a system controller in communication with said sensors and configured to control said vehicle lift based on the information obtained by said sensors.
2. The vehicle lift of claim 1, further comprising one or more lock sensors configured to measure whether locks of said swing arms are in a locked position or an unlocked position.
3. The vehicle lift of claim 2, wherein each of said locks is configured to maintain one of said swing arms in a specific angular position.
4. The vehicle lift of claim 2, wherein each of said locks is configured to maintain one of said swing arms in a specific extension position.
5. The vehicle lift of claim 1, wherein said system controller is configured to emit an interrogation signal that can be received by said RFID tags, wherein said RFID tags are configured to convert the interrogation signal into an electric potential for powering said sensors.
6. The vehicle lift of claim 5, wherein said system controller is configured to emit the interrogation signal on a periodic basis.
7. The vehicle lift of claim 5, wherein the periodic basis is less than once per second.

8. The vehicle lift of claim 5, wherein said RFID tags are configured to transmit the information obtained from the sensors in response to receiving the interrogation signal from the system controller.

9. The vehicle lift of claim 1, wherein said system controller is configured to analyze the information obtained by said sensors and halt the vehicle lift if a problem condition is determined to exist.

10. The vehicle lift of claim 9, wherein the problem condition is an overload of said vehicle lift.

11. The vehicle lift of claim 9, wherein the problem condition is a load imbalance between the swing arms of the vehicle lift.

12. The vehicle lift of claim 9, wherein the problem condition requires at least one or more of the swing arms being in an unlocked position.

13. A method for operating a vehicle lift, with the vehicle lift including a vertically-orientated column and a pair of vertically-shiftable swing arms, wherein the swing arms are configured to rotate with respect to the column, said method comprising the steps of:
 (a) engaging the swing arms into contact with lifting-points of a vehicle;
 (b) raising the vehicle;
 during said raising of step (b), emitting an interrogation signal to radio-frequency identification (RFID) tags in communication with sensors associated with the swing arms;
 wherein the sensors comprise load sensors configured to measure loads being supported by the swing arms, and wherein the load sensors comprise strain gauges configured to measure deflections experienced by the swing arms;
 (c) obtaining, via the sensors, information related to the swing arms;
 (d) analyzing the information obtained from the sensors to determine if a problem condition exists; and
 (e) upon determining the problem condition exists, halting operation of the vehicle lift.

14. The method of claim 13, wherein the information obtained in step (c) comprises information indicative of the loads being supported by the swing arms.

15. The method of claim 14, wherein the problem condition is the swing arms being overloaded.

16. The method of claim 14, wherein the problem condition is the vehicle being unbalanced on the swing arms.

17. The method of claim 13, wherein step (c) further comprises obtaining information indicative of locks on the swing arms being in either a locked position or an unlocked position.

18. A vehicle lift system comprising:
 at least two lifting-posts, wherein each lifting-post comprises—
  a vertically-orientated column,
  a pair of swing arms vertically-shiftable with respect to said column, wherein said swing arms are configured to rotate with respect to said column about a generally horizontal plane,
  a sensor positioned on each of the swing arms, wherein each sensor comprises a load sensor configured to measure a load being supported by the swing arm with which the load sensor is associated, and wherein said load sensors comprise strain gauges configured to measure deflections experienced by said swing arms.
 an RFID tag associated with each sensor, wherein said RFID tags are configured to provide power to said sensors and to transmit measurement data indicative of the loads measured by the sensors; and
 a system controller configured to receive the measurement data transmitted by the RFID tags and to control the lifting-posts based on the measurement data.

* * * * *